Nov. 18, 1969  A. SCHMERMUND  3,478,632
FILTER-SECTION DISTRIBUTING DEVICES, ESPECIALLY FOR
USE IN THE MANUFACTURE OF FILTER TIPPED CIGARETTES
Filed Dec. 20, 1967  6 Sheets-Sheet 1
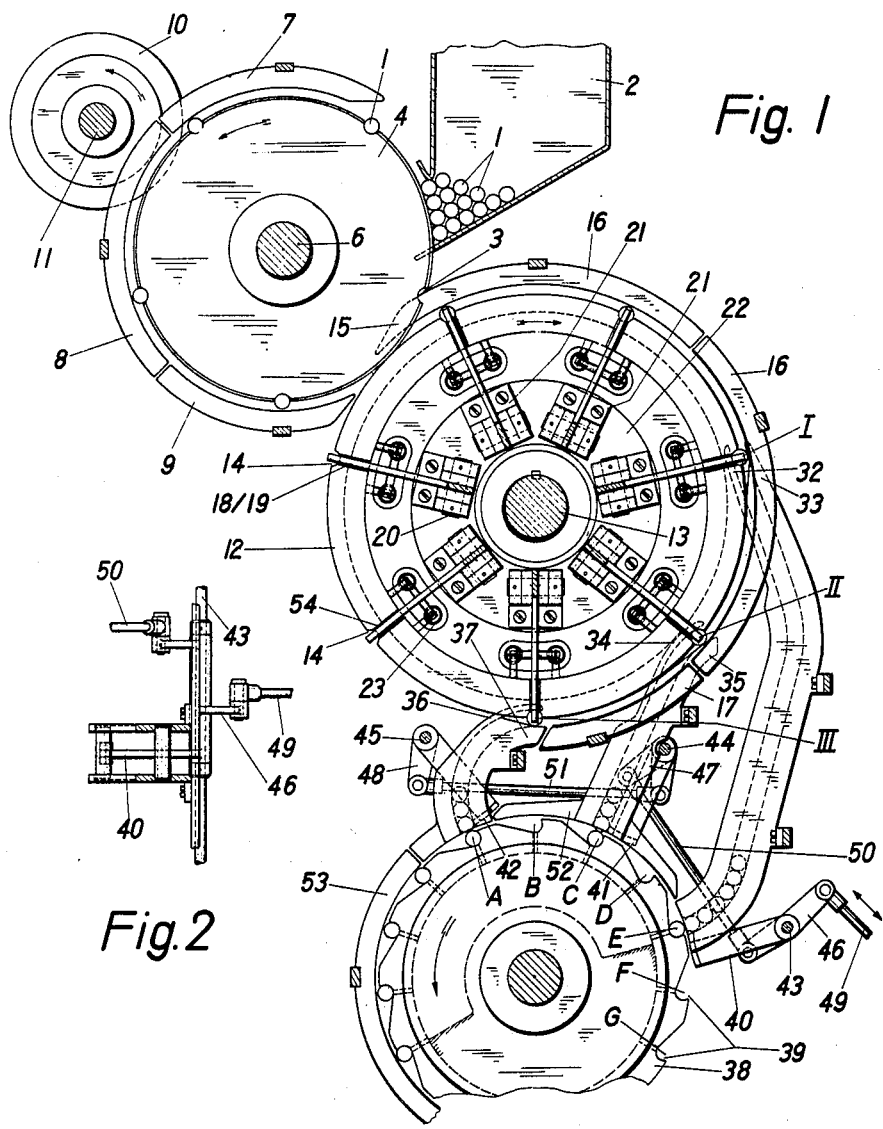
INVENTOR
ALFRED SCHMERMUND
BY Nolte and Nolte
ATTORNEYS Nov. 18, 1969 A. SCHMERMUND 3,478,632
FILTER-SECTION DISTRIBUTING DEVICES, ESPECIALLY FOR
USE IN THE MANUFACTURE OF FILTER TIPPED CIGARETTES
Filed Dec. 20, 1967 6 Sheets-Sheet 2
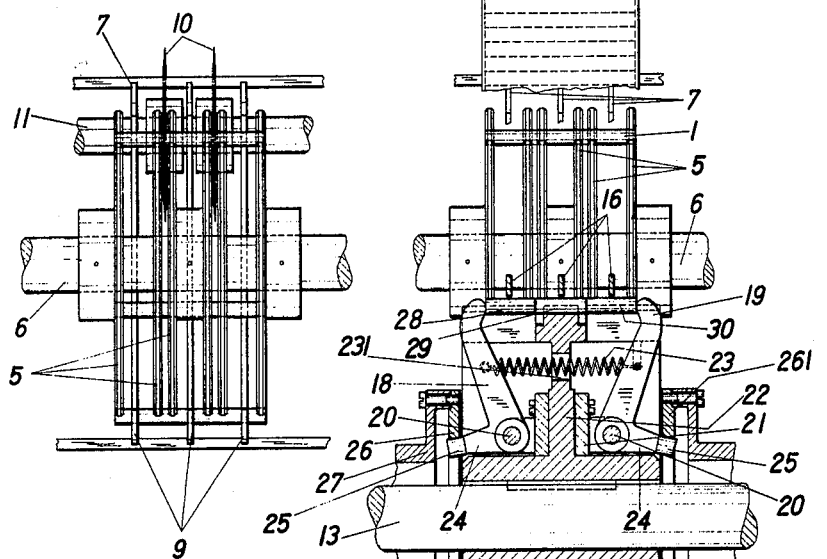
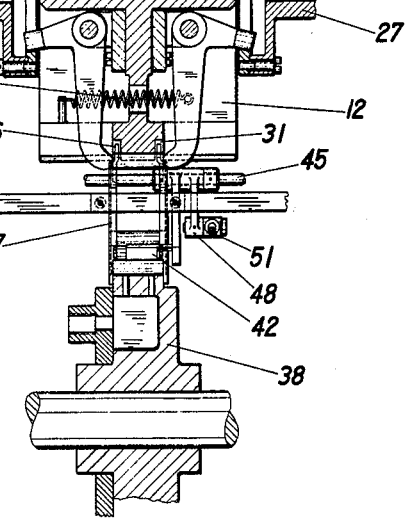
INVENTOR
ALFRED SCHMERMUND
BY Nolte and Nolte
ATTORNEYS INVENTOR
ALFRED SCHMERMUND
BY Nolte and Nolte
ATTORNEYS Nov. 18, 1969     A. SCHMERMUND     3,478,632
FILTER-SECTION DISTRIBUTING DEVICES, ESPECIALLY FOR
USE IN THE MANUFACTURE OF FILTER TIPPED CIGARETTES
Filed Dec. 20, 1967        6 Sheets-Sheet 4

INVENTOR
ALFRED SCHMERMUND
BY *Nolte and Nolte*
ATTORNEYS

Fig. 7

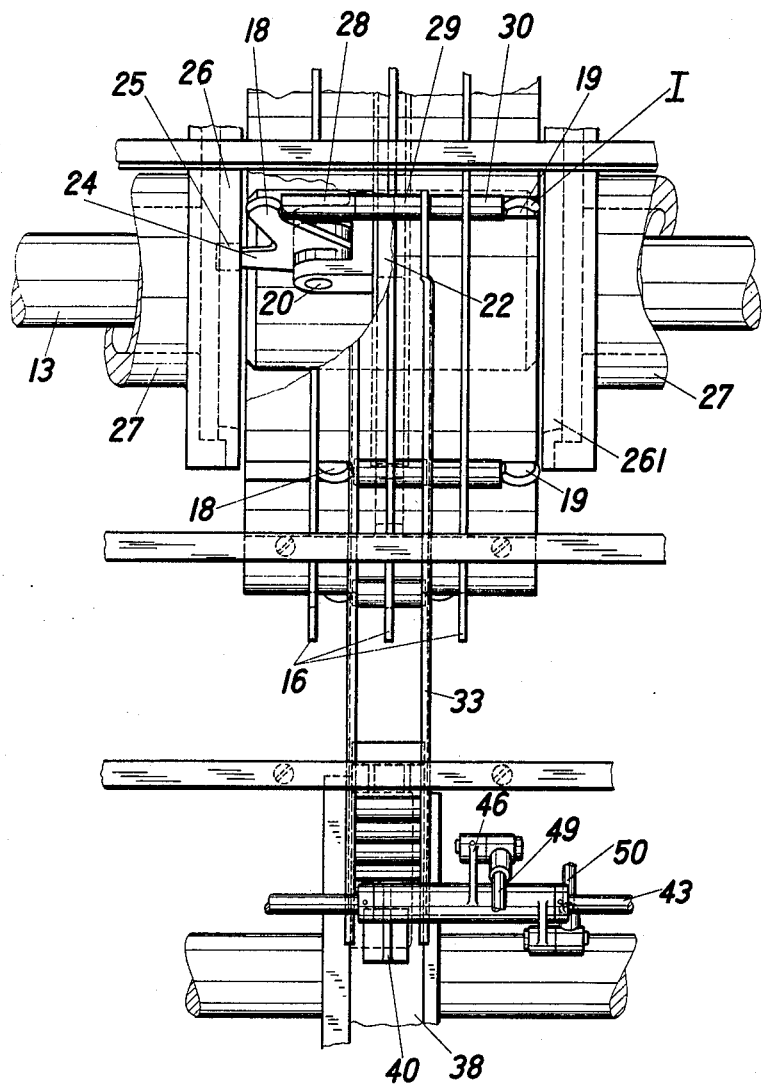

United States Patent Office 3,478,632
Patented Nov. 18, 1969

3,478,632
FILTER-SECTION DISTRIBUTING DEVICES, ESPECIALLY FOR USE IN THE MANUFACTURE OF FILTER TIPPED CIGARETTES
Alfred Schmermund, 62 Kornerstrasse, 5820 Gevelsberg, Westphalia, Germany
Filed Dec. 20, 1967, Ser. No. 692,034
Claims priority, application Germany, Dec. 29, 1966, Sch 40,027
Int. Cl. B26d 7/06
U.S. Cl. 83—105                         7 Claims

ABSTRACT OF THE DISCLOSURE

Devices are described by means of which filter rods, the length of which equals an even multiple greater than two of the length of a filter plug, are each divided into a plurality of filter sections, the length of which equals twice the length of a filter plug for a filter tipped cigarette, cigarillo or cigar. The device essentially comprises three rotatable drums. A first one of said drums receives filter rods which by means of a cutter are divided into filter sections. The filter sections are transferred to a second one of said drums. The second drum co-operates with means for transferring the filter sections, one at a time, to guide means or chutes in which the filter sections are temporarily stored and from which they are supplied to the third drum conveying the filter sections to a working station for further processing the same.

BACKGROUND OF THE INVENTION

The invention relates to filter-section distributing devices, especially for use in the manufacture of filter tipped cigarettes, However, the devices may equally well be used in the manufacture of filter tipped cigarillos or cigars. Accordingly, reference herein to filter tipped cigarettes is intended to embrace filter tipped cigarillos or cigars.

In the manufacture of filter tipped cigarettes, it is usual to provide a filter section of twice the length of a single filter plug of each cigarette and to attach a tobacco rod, the length of which corresponds to that of a single cigarette, to each end of the filter section by wrapping cigarette paper, around the filter section and the two tobacco rods. Adjacent ends of the cigarette paper are glued together, and the filter section is cut at its centre perpendicularly to the axis of the filter section, whereby two filter tipped cigarettes are obtained, each comprising a filter plug of half the length of the filter section. In an analogous manner it is possible to manufacture filter tipped cigarillos or cigars.

The length of the filter sections is usually too short for convenient handling of the sections during their manufacture. For this reason, it is usual to manufacture filter rods of a length corresponding to an even multiple greater than two of a filter plug and subsequently to subdivide the filter rods into filter sections of twice the length of a filter plug. In most cases, such filter rods are of a length that is six times the length of a filter plug, the filter rod being subdivided into three filter sections, each for two filter tipped cigarettes, each cigarette thus having a filter plug of one sixth of the length of the original filter rod.

Filter-section distributing devices for supplying filter sections to a working station for further handling have been proposed, which each comprise a distributing drum having three discs in recesses of which filter sections are inserted. By means of transfer devices the filter sections placed in recesses of two of said discs are transferred by a transfer device to recesses in the third disc, so that finally all the recesses of the third disc are occupied.

Another filter-section distributing device has been proposed, in which a distributing drum comprises three discs rotatable at different angular velocities. The distributing drum places the filter sections in recesses of a transfer drum where they are centred by deflecting means.

SUMMARY OF THE INVENTION

It is an object of the present invention to provide a filter-section distributing device in which a centring of filter sections is effected within a distributing drum by subjecting the filter sections to such gentle treatment that any appreciable damage to the filter sections may be avoided.

It is another object of the invention to provide a filter-section distributing device which has a mechanism which is simple in its construction and reliable in operation for conveying the filter sections from a distributing drum to a further drum which conveys the filter sections to a working station.

With these objects in view, the present invention consists in the combination of features which will now be described in detail with reference to a preferred embodiment of the invention, the embodiment being given by way of example only.

BRIEF DESCRIPTION OF THE DRAWINGS

In the accompanying somewhat diagrammatic drawings:
FIG. 1 illustrates a side elevation of a preferred embodiment of the invention;
FIG. 2 illustrates a detail of a pull-rod control mechanism of the embodiment of FIG. 1;
FIG. 3 illustrates a front elevation, partly in section and partly broken away, of the embodiment of FIG. 1;
FIG. 4 illustrates a front elevation of a cutting arrangement of the embodiment of FIG. 1;
FIG. 7 illustrates a portion of FIG. 3 on a larger scale and shows details near a station II;
and
FIG. 8 illustrates a portion of FIG. 3 on a larger scale and shows details near a station I, the said stations I, II and III being indicated in FIG. 1.

DESCRIPTION OF THE PREFERRED EMBODIMENT

Figure 5:
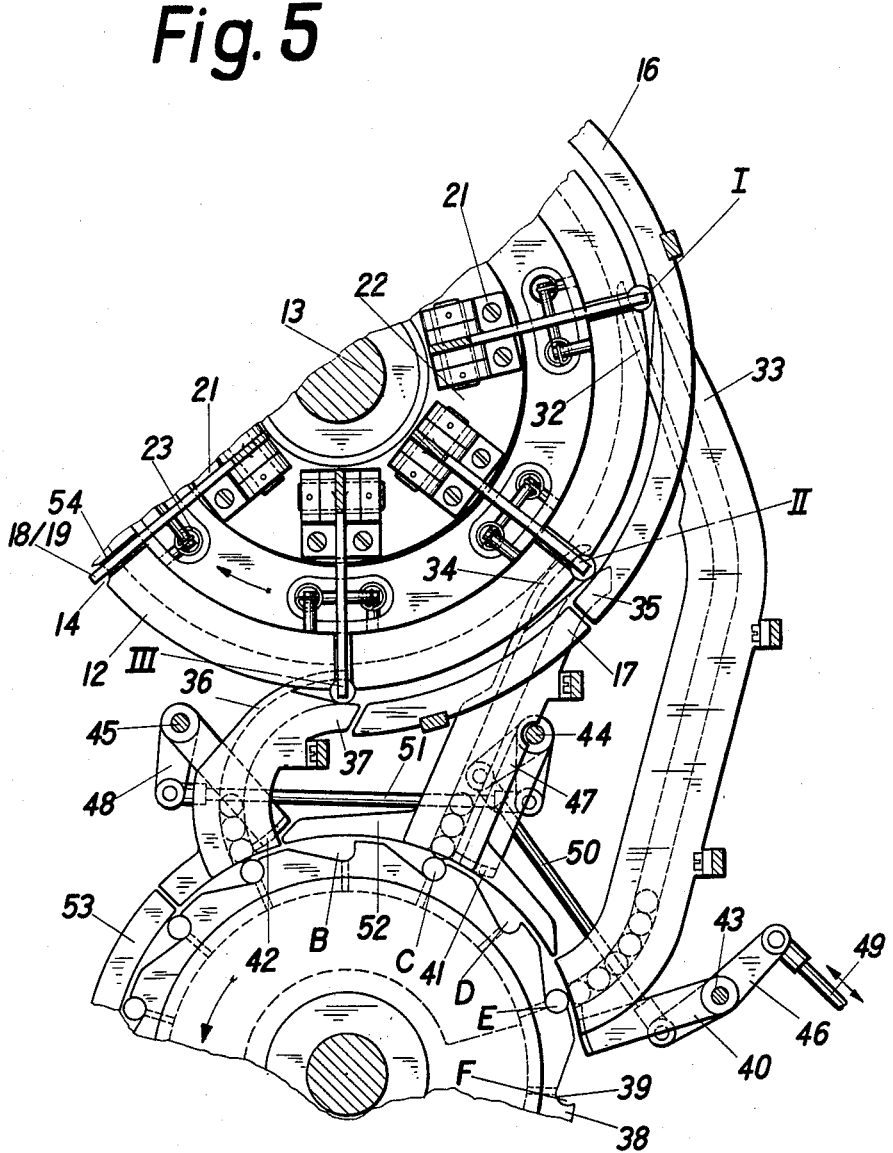
FIG. 5 illustrates a centre portion of FIG. 1 on a larger scale.

The embodiment illustrated comprises a hopper 2 (FIGS. 1 and 3), for filter rods 1. The hopper 2 has an outlet at the vicinity of which a first drum 4 is provided, which comprises six discs 5 fixed to a rotatable shaft 6. The discs 5 have recesses 3 at their peripheries, each set of six corresponding recesses 3 of the discs 5 being aligned with one another for receiving a filter rod 1. Curved guide members 7, 8, 9 extend along part of the periphery of the drum 4 and serve to guide the filter rods 1 and to hold the same in the recesses 3. Two cutter discs 10 (see also FIG. 4) are fixed to a rotatable shaft 11 for dividing each filter rod 1 on the drum 4 into three filter sections 28, 29, 30 (FIG. 3).

Adjacent the drum 4, a second drum 12 is provided which is fixed to a rotatable shaft 13. The drum 12 has a hub having a central annular ridge 22. The shafts 6, 11, 13 are rotatably mounted in a frame of the device. The distributing drum 12 has recesses 14 at its periphery. Each recess 14 is arranged for receiving a group of three filter sections 28, 29, 30. Curved guide members 16, 17 extend along part of the periphery of the drum 12 for guiding filter sections and holding the same in the recesses 14. Three guide members 16 are provided side by side (see FIG. 3), the ends of which are shaped to form guide tongues 15 which engage between the discs 5 of the drum 4 and ensure a reliable transfer of the filter sections from the drum 4 to the drum 13.

Figure 6:
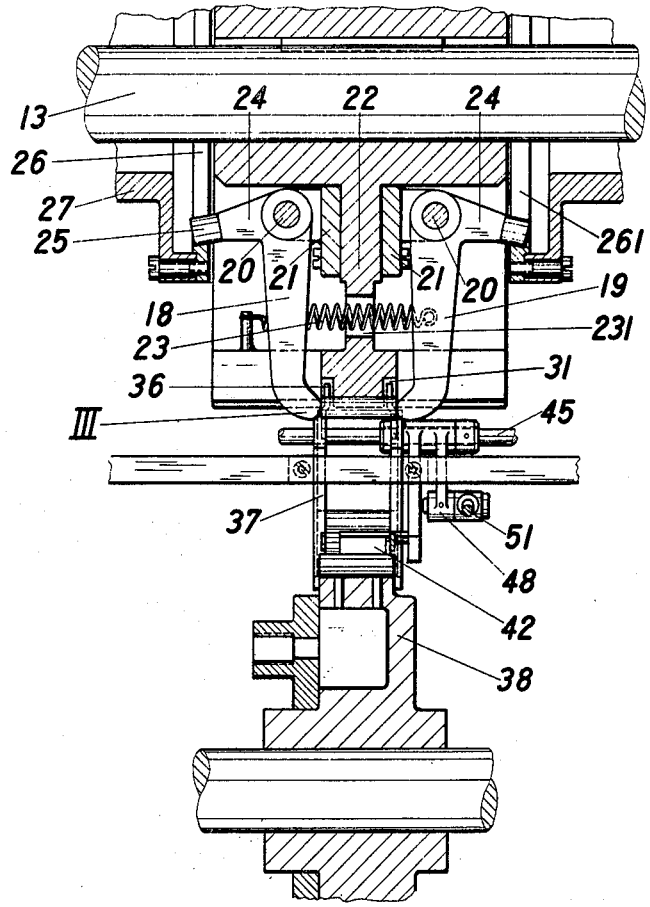
FIG. 6 illustrates a portion of FIG. 3 on a larger scale and shows details near a station III.
Figure 7:
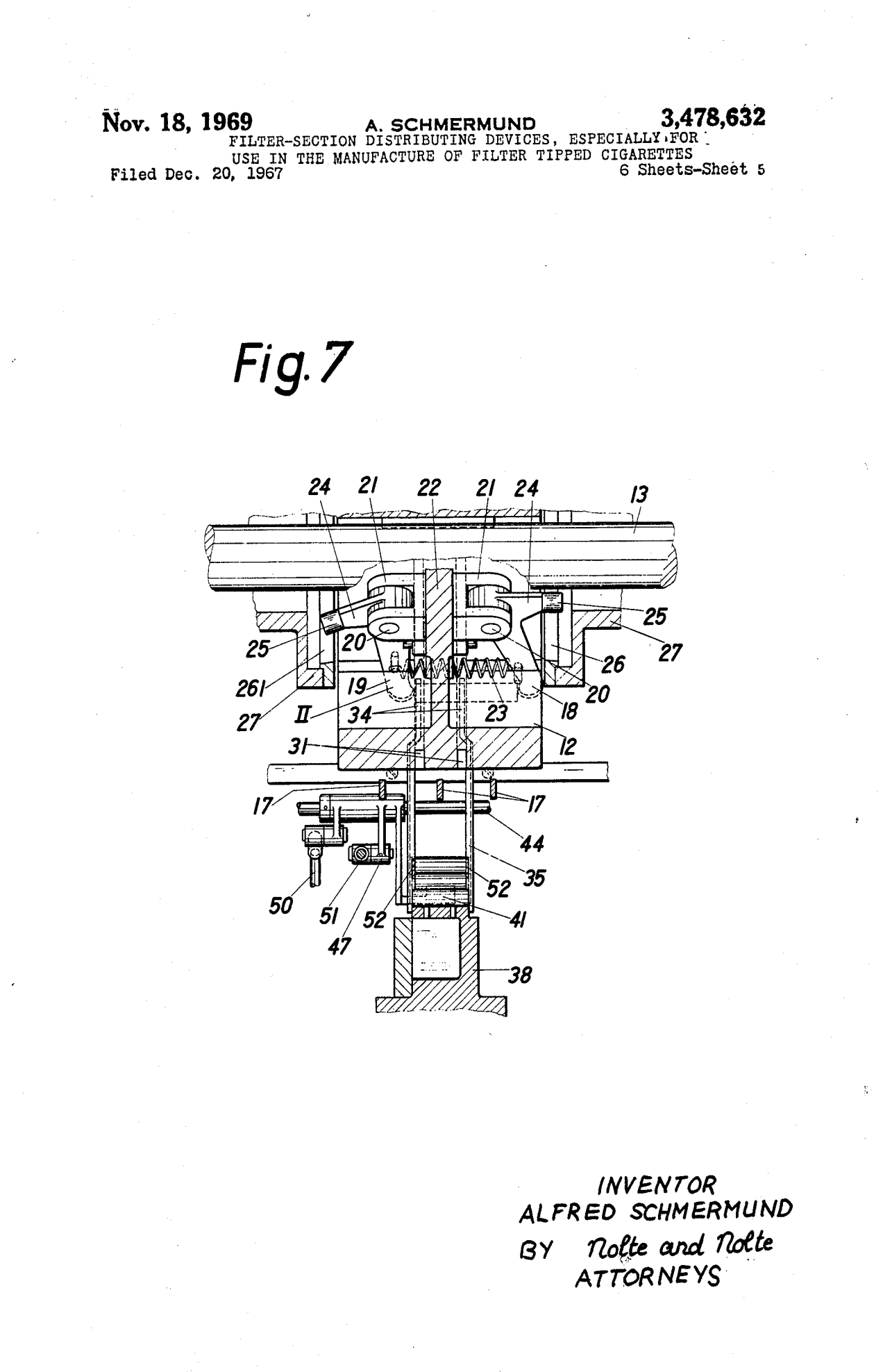

The second drum 12 is composed of rings or ring segments, the width of which substantially equals the length of one filter section. At each region of one of the recesses 14 and between each pair of adjacent rings or ring segments, a slot is provided into which centering levers 18, 19 extend, one pair of levers 18, 19 being provided for each recess 14 (see also FIGS. 6, 7 and 8). The levers 18, 19 associated with each recess 14 are mounted rockably on shafts 20 held in bearing supports 21 fixed to the ridge 22, whereby the levers 18, 19 are rotatable bodily with the drum 12. Each of the centring levers 18, 19 has an outwardly directed lever arm 24 carrying a follower roller 25 co-operating with stationary cam discs 26, 261 held on the frame of the device by means of brackets 27. The levers 18, 19 of each pair are linked by a tension spring 25 which extends through an opening 231 in the ridge 22 and holds the follower rollers 25 in contact with the stationary cam disc 26 or 261 respectively.

The filter section 29 lies between the filter sections 28 and 30. At the region where the filter section 29 lies, two parallel annular grooves 31 are provided in the drum 12. Three deflecting channels 33, 35, 37 (see FIGS. 1 and 5 to 8) are disposed in the peripheral direction of the drum 12, each of the channels 33, 35, 37 terminates at their ends adjacent the drum 12 in pairs of guide tongues 32, 34, 36 respectively. The guide tongues 32, 34, 36 extend into the annular grooves 31. Each of the deflecting channels 33, 35, 37 comprises guide walls forming a chute in which filter sections can accumulate one on top of another.

The deflecting channels 33, 35, 37 cooperate with a third rotatable transfer drum 38 having recesses 39 which, when viewed as shown in FIG. 1, are of sawtooth-like shape. The drum 38 is fixed to a rotatable shaft mounted in the frame of the device. Each of the channels 33, 35, 37 is normally closed at its lower end by a slide 40, 41, 42 respectively, said slides being mounted rockably on shafts 43, 44, 45 mounted on the frame of the device. The slides 40, 41, 42 are keyed to levers 46, 47, 48 respectively of a pull-rod control mechanism. The levers 46, 47, 48 are linked together by pull-rods 49, 50, 51 (see also FIG. 2). The pull-rod 49 is reciprocatable in any known manner as indicated by the adjacent double arrow to effect simultaneous rocking of all the slides 40, 44, 42. Adjacent the transfer drum 38, curved guide members 52 and 53 are provided for guiding the filter sections and holding the same in the recesses 39.

The device illustrated operates as follows:

The cutter discs 10 and the drums 4, 12, 38 are rotated by any suitable known drive in the directions of the inscribed arrows. Filter rods 1 are placed in the hopper 2.

The filter rods 1 are received from the hopper 2 by the drum 4, one in each recess 3 thereof. Each filter rod 1 when, on rotation of the drum 4, passing the cutter discs 10, is cut into three filter sections. Groups of three filter sections 28, 29, 30 are each transferred by the guide tongues 15 from the recesses 3 of the first drum 4 to the recesses 14 of the second drum 12. The filter section 29 lies at the centre of each group of filter sections 28, 29, 30 and is deflected by the guide tongues 32 of the channel 33 at a station I and removed from the centre of the respective recess 14 to slide down the channel 33. The free ends of the centring levers 18, 19 are held apart from each other against the action of the spring 23 by the stationary cams 26 and 261 so that said lever ends lie only loosely against the ends of the filter sections 28 and 30 without applying any appreciable pressure on them. When now on further rotation of the drum 12 the remaining filter sections 28 and 30 of the particular group from which the filter section 29 has just been removed travels from station I to the next station II, one of the cams 26 and 261 has a portion which is so shaped that the respective centring lever, for example the lever 18, is turned inwards and moves the respective filter section, in the example the filter section 28, into the central position originally occupied by the filter section 29 so that the filter section 28 when reaching the station II lies adjacent the guide tongues 34. The filter section 28 is now deflected by the guide tongues 34 of the channel 35 at the station II and is removed from its recess 14 to slide down the channel 35. Similarly, when on further rotation of the drum 12 the remaining filter section 30 travels from station II to the next station III the other cam causes the other centring lever, in the example the lever 19, to be turned inwards and to move the filter section 30 into the central position so that the filter section 30 when reaching the station III lies adjacent the guide tongues 36 of the channel 37 and is removed from its recess 14 to slide down the channel 37.

The filter sections collect at the lower ends of the deflecting channels 33, 35, 37, which are normally closed by the slides 40, 41, 42 respectively. The lower ends of the three deflecting channels 33, 35, 37 are offset in relation to one another by twice the spacing of the recesses 39 of the third drum 38, so that the lower ends of the channels 37, 35, 33 are above the particular recesses A, C, and E respectively when the device is in the position illustrated in FIG. 1. In this position of the third drum 38 the rod 49 is operated by any suitable known means whereby the slides 40, 41, 42 are substantially simultaneously retracted to temporarily open the channels 33, 35, 37 by means of the pull-rods 49, 50, 51, so that a filter section enters each of the recesses A, C, and E of the drum 38. The slides 40, 41, 42 are then returned into their channel-closing positions. When the transfer drum 38 has been rotated so that now the lower ends of the channels 37, 35, 33 are above the recesses B, D, F respectively the slides 40, 41, 42 are again retracted so that the recesses B, D, F each receive a filter section from the respective channels. The slides are then closed again until, on further rotation of the drum 38, the recess G reaches the lower end of the channel 37 and so on. The drum 38 conveys the filter sections away from the drum 14, for example to a working station where the filter sections are removed from the drum 38.

It will be seen that the drums 12 and 38 need not rotate in synchronism, since the channels 33, 35, 37 normally each contain a plurality of filter sections ready for being delivered to the recesses 39 of the drum 38 when the respective recesses 39 have reached their correct positions relative to the lower ends of the channels 33, 35, 37. In addition, the individual filter sections are treated very gently during the transfer from one drum to the next. Displacement of the filter sections in their longitudinal direction is effected only inside the recesses 14 of the drum 12. Thereby any appreciable damage to the filter sections may be avoided.

Details of the drive from the drums and of the pull-rod 49 of the control mechanism have not been described and illustrated since similar drives and controls are well known in the art.

It should be clearly understood that the embodiment described and illustrated is given by way of example only. Many modifications, omissions and additions are possible without departing from the spirit of this invention.

I claim:

1. In a filter-section distributing device which comprises a hopper for filter rods, said hopper having an outlet for said filter rods, a first rotatable drum at said outlet, said first drum having recesses for receiving filter rods from said hopper, cutting means for dividing filter rods in said recesses into groups of filter sections, a second rotatable drum having recesses for receiving groups of said filter sections, from said first drum, and a third rotatable drum having recesses for receiving filter sections from said second drum for conveying said filter sections away from said second drum, the combination of a plurality of deflecting channels arranged between said second drum and said third drum, said plurality of said channels corresponding to the plurality of filter sections into which each filter rod is divided by said cutting means, said deflecting channels being constructed and arranged for transferring said filter sections one by one from each of said recesses of said second drum into one of said channels, at least one lever for each of said recesses of said second drum, said lever being bodily rotatable with said second drum, stationary cam means for turning said lever when a filter section has been removed from said recess and for moving another filter section of said recess into the position previously occupied by said removed filter section, said channels being adapted to accumulate filter sections therein and terminating adjacent said third drum, and means for discharging the filter sections of each of said channels one by one, into said recesses of said third drum.

2. A combination as defined in claim 1, wherein said second drum has two angular grooves, said deflecting channels comprising guide tongues projecting into said grooves.

3. A combination as defined in claim 1, and further comprising curved guide members adjacent the periphery of said second drum and arranged for guiding said filter sections and holding them in said recesses of said second drum.

4. A combination as defined in claim 1, wherein said second drum comprises a central annular ridge, said lever being held on said ridge for rocking in an axial plane, said lever carrying a follower roller cooperating with said cam means.

5. A combination as defined in claim 1, and further comprising a plurality of slides, one for each of said deflecting channels, for closing and opening said channels at their ends adjacent said third drum.

6. A combination as defined in claim 5, and further comprising a pull-rod arrangement common to said slides, said ends of said channels being offset in relation to one another in accordance with the spacing of said recesses of said third drum, said slides being operable by said pull-rod arrangement in dependence on the rotation of said third drum.

7. A combination as defined in claim 1, wherein said cutting means are constructed for dividing each filter rod into an odd number of filter sections, said guide channels being arranged for removing the middle filter section which is located at a centre portion of each of said recesses of said second drum, two levers being provided for each recess of said second drum, each of said two levers being located at one end of said recess, said levers being arranged for moving a lateral filter section in each recess into said centre position.

References Cited

UNITED STATES PATENTS 3,067,644  12/1962  Dearsley _____ 83—411 X
3,286,809  11/1966  Meinecke _____ 83—102 X JAMES M. MEISTER, Primary Examiner U.S. Cl. X.R.

83—159, 411; 198—32